May 31, 1932. T. B. RUNCIMAN 1,861,321
TRUCK
Filed June 12, 1931 2 Sheets-Sheet 1

Inventor
T. B. Runciman

By Clarence A. O'Brien
Attorney

May 31, 1932.  T. B. RUNCIMAN  1,861,321
TRUCK
Filed June 12, 1931   2 Sheets-Sheet 2

Inventor
T. B. Runciman

By Clarence A. O'Brien
Attorney

Patented May 31, 1932

1,861,321

UNITED STATES PATENT OFFICE

TRUMAN B. RUNCIMAN, OF EXETER, CALIFORNIA

TRUCK

Application filed June 12, 1931. Serial No. 543,999.

The present invention relates to trucks and has for its prime object to provide means for tilting the bed of a dump truck.

Another very important object of the invention resides in the provision of an improved means for operating a tilting bed of automobile trucks which means is exceedingly simple in construction, inexpensive to manufacture, easy to manipulate and install, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 1:
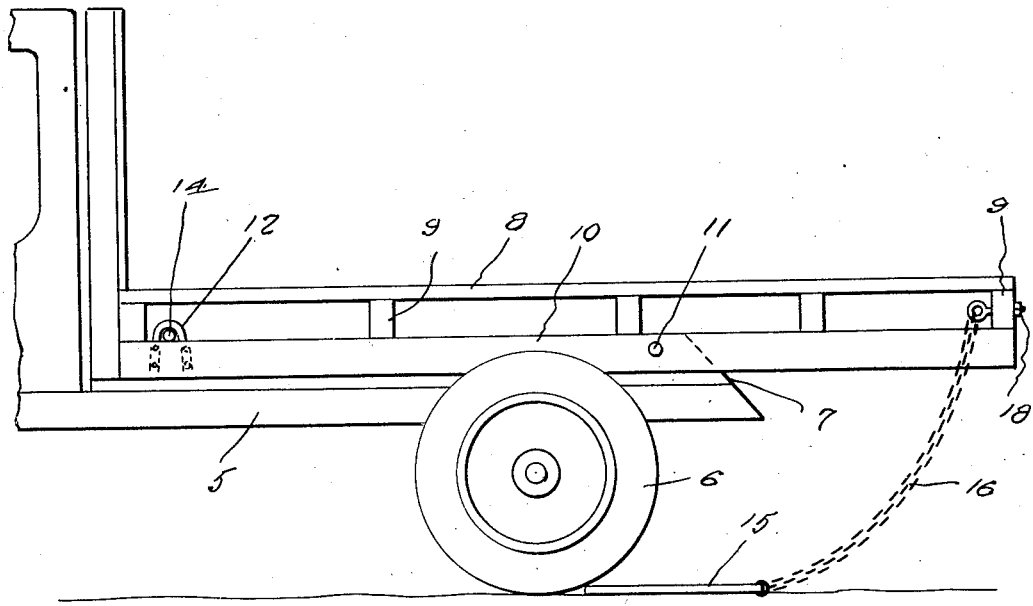
Figure 1 is a fragmentary side elevation of the truck showing my operating means ready for action.
Figure 3:
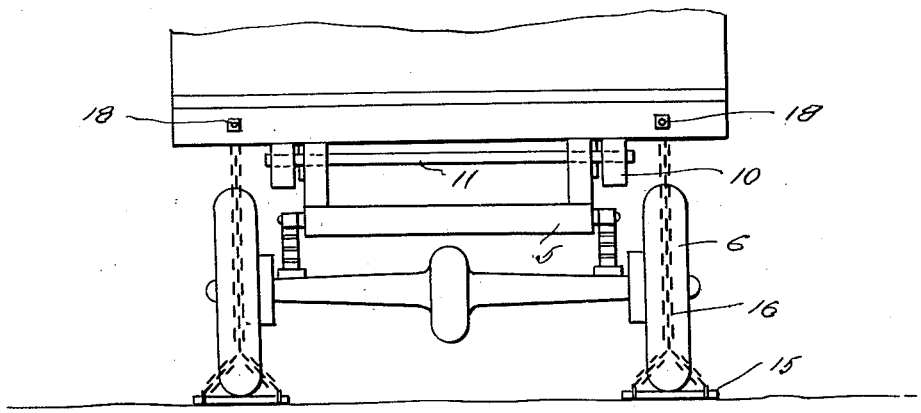
Figure 3 is a rear elevation.

Referring to the drawings in detail it will be seen that the numeral 5 denotes a truck frame, numeral 6 the rear wheels thereof and numerals 7 the sills on the frame 5. A tilting bed 8 is mounted on a frame comprising cross members 9 mounted on longitudinal members 10. The longitudinal members are mounted one to the outside of each sill 7 and the intermediate portions of the longitudinal members 10 are rockable as at 11 on the rear portions of the sill 7. Loops or straps 12 rise from the forward portions of the sills 7 so that a pin or rod 14 may be extended therethrough over top of the forward portions of the members 10 to prevent tilting of the bed 8.

Figure 2:
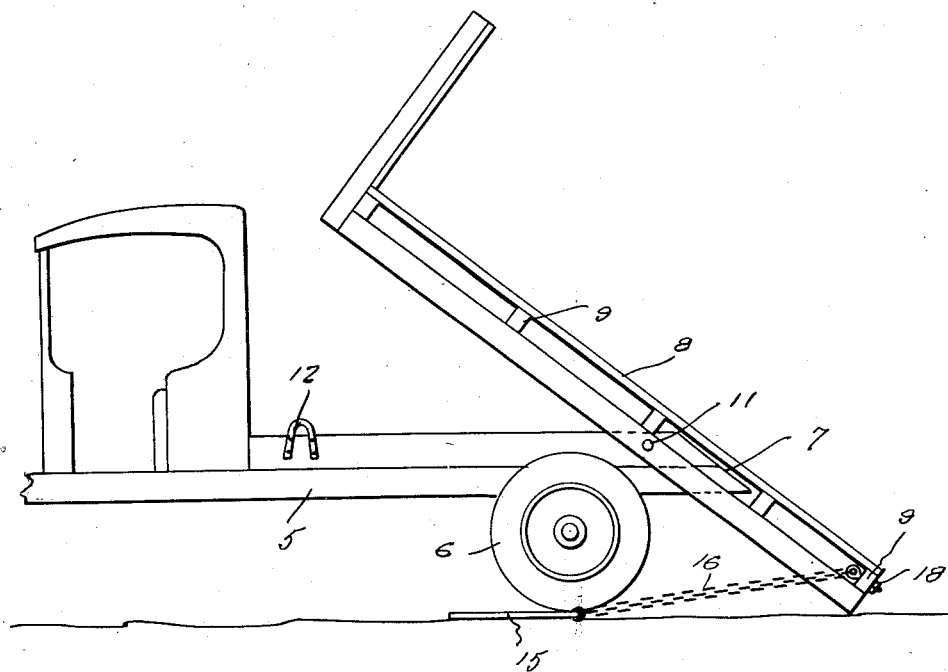
Figure 2 is a similar view showing the bed tilted.
Figure 4:
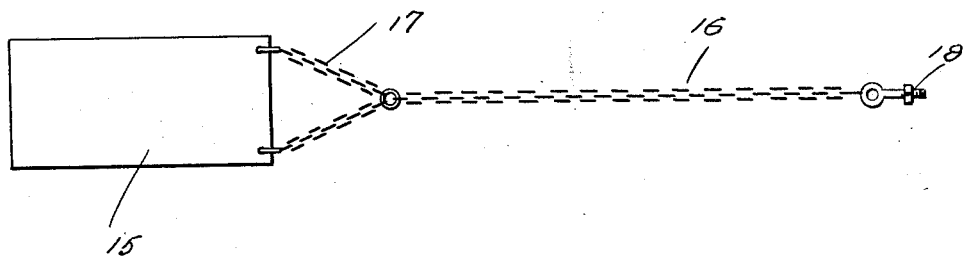
Figure 4 is a plan view of one of the means.

Numerals 15 denote plates or shoes attached to chains 16 by yokes 17. The chains 16 are bolted as at 18 to the rearmost cross member 9. Now when it is desired to tilt the bed of the truck the shoes or plates 15 are placed immediately behind the rear wheel 6 as is shown in Figure 1. The pin 14 is then removed. The truck is then backed up to cause the wheel 6 to ride on the shoes 15, thus causing the chain 16 to become taut and to cause the tilting of the bed from the position shown in Figure 1 to the position shown in Figure 2.

It is thought that the construction, operation, utility and advantages of the invention will now be quite apparent to those skilled in this art without a more detailed description threreof.

The present embodiment of the invention has been described in considerable detail merely for the purposes of exemplification since in actual practice it attains the features of advantage enumerated as desirable in the statement of the invention and the above description.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:

The combination of a vehicle having a frame, wheels supporting the frame, a body tiltably mounted upon the frame and extending to a point rearward of the wheels, and a flexible element secured to said body rearwardly of said wheels, and having a plate at the free end thereof adapted to be detachably positioned between one of said wheels and the ground whereby subsequent rearward movement of the vehicle will tension the flexible element and tilt the body.

In testimony whereof I affix my signature.

TRUMAN B. RUNCIMAN.